(12) United States Patent
De Biasio

(10) Patent No.: US 6,863,714 B2
(45) Date of Patent: Mar. 8, 2005

(54) STORAGE APPARATUS

(75) Inventor: Ennio De Biasio, Bascharage (LU)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/348,360

(22) Filed: Jan. 21, 2003

(65) Prior Publication Data

US 2003/0145731 A1 Aug. 7, 2003

(30) Foreign Application Priority Data

Feb. 1, 2002 (DE) .......................... 102 03 959

(51) Int. Cl.⁷ .............................................. B01D 53/04
(52) U.S. Cl. ......................... 96/132; 96/133; 96/137; 96/144; 96/149; 96/153; 55/385.3; 123/519
(58) Field of Search ................. 96/130–137, 143, 96/144, 149, 153, 154; 55/385.3; 123/519, 520

(56) References Cited

U.S. PATENT DOCUMENTS

| | | | | |
|---|---|---|---|---|
| 4,280,466 A | * | 7/1981 | Walters | 123/520 |
| 4,381,929 A | * | 5/1983 | Mizuno et al. | 96/130 |
| 4,386,947 A | * | 6/1983 | Mizuno et al. | 96/137 |
| 4,766,872 A | * | 8/1988 | Kato et al. | 123/519 |
| 5,207,808 A | * | 5/1993 | Haruta et al. | 96/131 |
| 5,304,235 A | * | 4/1994 | Watanabe et al. | 96/144 |
| 5,337,721 A | * | 8/1994 | Kasuya et al. | 123/519 |
| 5,599,384 A | * | 2/1997 | Yoshida et al. | 96/143 |
| 5,632,808 A | * | 5/1997 | Hara et al. | 96/137 |
| 5,809,978 A | * | 9/1998 | Krimmer et al. | 123/519 |
| 5,910,637 A | * | 6/1999 | Meiller et al. | 96/135 |
| 5,934,260 A | | 8/1999 | Gadkaree et al. | |
| 6,230,693 B1 | | 5/2001 | Meiller et al. | |
| 6,279,548 B1 | * | 8/2001 | Reddy | 123/520 |
| 6,321,726 B1 | * | 11/2001 | Khami et al. | 123/519 |
| 6,390,073 B1 | | 5/2002 | Meiller et al. | |
| 6,460,516 B2 | * | 10/2002 | Kimoto et al. | 123/519 |
| 6,488,748 B2 | * | 12/2002 | Yamafuji et al. | 96/131 |
| 6,537,354 B2 | * | 3/2003 | Meiller et al. | 96/139 |
| 6,540,815 B1 | * | 4/2003 | Hiltzik et al. | 95/146 |
| 2001/0039881 A1 | * | 11/2001 | Moriyama et al. | 96/139 |
| 2002/0020398 A1 | | 2/2002 | Kimoto et al. | |
| 2002/0078931 A1 | | 6/2002 | Makino et al. | |
| 2002/0124732 A1 | | 9/2002 | Hara et al. | |
| 2004/0031469 A1 | * | 2/2004 | Reddy | 123/519 |

FOREIGN PATENT DOCUMENTS

| | | |
|---|---|---|
| DE | 10021420 A1 | 11/2001 |
| EP | 1113163 A2 | 7/2001 |
| JP | 6185419 | 7/1994 |
| JP | 6280693 | 10/1994 |

* cited by examiner

Primary Examiner—Robert H. Spitzer
(74) Attorney, Agent, or Firm—Jimmy L. Funke

(57) ABSTRACT

A storage apparatus has a container having an inlet, an outlet and a regeneration air opening. Active carbon is provided as the storage medium in the container. Furthermore, a monolith is disposed in the container.

9 Claims, 1 Drawing Sheet

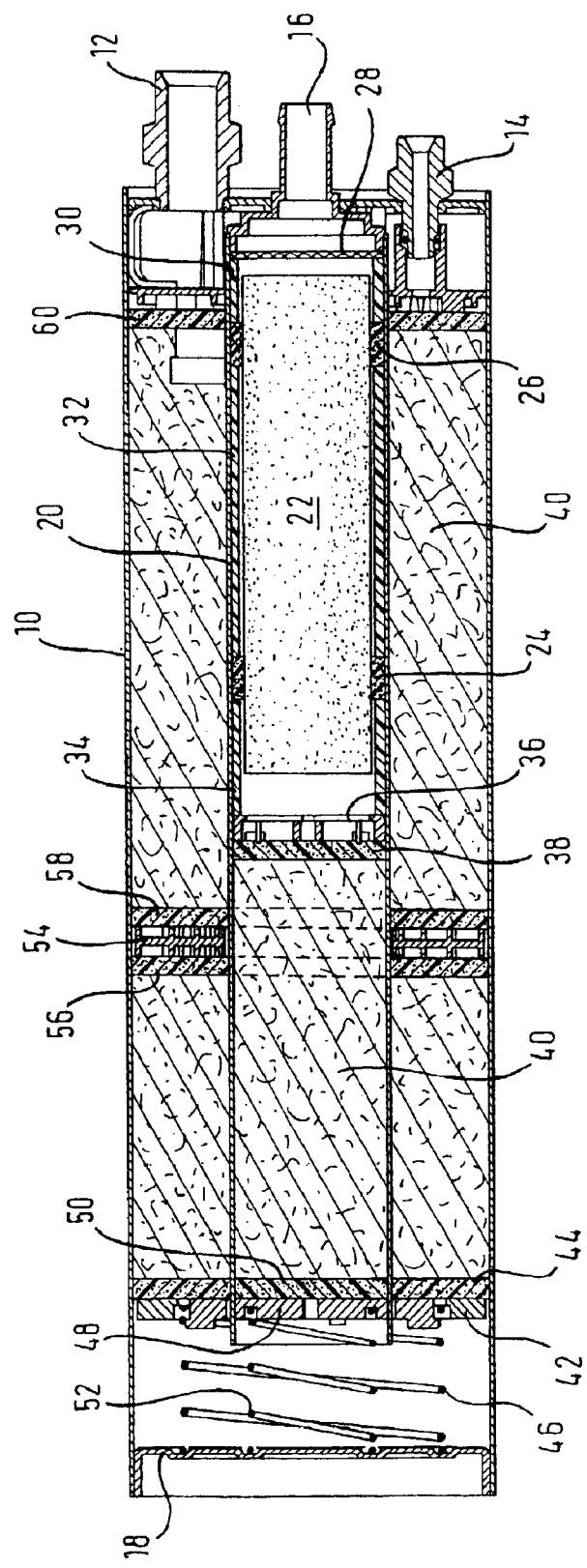

STORAGE APPARATUS

TECHNICAL FIELD

The invention relates to a storage apparatus for the temporary storage of volatile fuel components, comprising a container having an inlet, an outlet and a regeneration air opening, with active carbon being provided as the storage medium in the container.

BACKGROUND OF THE INVENTION

Such storage apparatuses are generally known and serve for the intermediate storage of the hydrocarbons which arise due to evaporation in a fuel container and to supply them to the internal combustion engine again for combustion when suitable conditions of use apply. Since the absorption volume of the active carbon is limited, a constant regeneration of the active carbon must take place, in that air is sucked in through the regeneration air opening with the engine running and is subsequently supplied to the engine as a mixture for combustion.

SUMMARY OF THE INVENTION

It is the object of the present invention to provide a storage apparatus of the kind initially named which emits a minimum concentration of hydrocarbons to the environment in operation.

This object is satisfied by the features of claim 1 and in particular in that a monolith, in particular a ceramic monolith, is provided in the container between the regeneration air opening and the active carbon in order to prevent a discharge of hydrocarbons through the regeneration air opening.

In accordance with the invention, ambient air is sucked in through the regeneration air opening in operation on the regeneration of the storage apparatus and the air sucked in subsequently flows through the monolith, which can in particular consist of ceramic material. This air subsequently flows through the active carbon provided in the container and thereby forms a mixture with the hydrocarbons stored at the active carbon which can be supplied to the engine for combustion. The supply of this mixture is usually controlled by a valve which, in the closed state, closes the connection between the outlet of the storage apparatus and the internal combustion engine. With the valve closed, the volatile fuel components produced in the tank of the motor vehicle can enter into the storage apparatus through the inlet of the container and are there adsorbed by the active carbon.

In this connection, it is ensured by the monolith provided in accordance with the invention between the active carbon and the regeneration air opening that no, or only a minimum concentration of hydrocarbons can be discharged into the environment through the regeneration air opening.

Advantageous embodiments of the invention are described in the description, in the drawing and in the dependent claims.

In accordance with a first advantageous embodiment, the monolith is mounted in a vibration damped manner. Such a mounting is in particular advantageous with ceramic monoliths, since these are brittle and breakable so that it must be prevented that impacts or forces are transmitted to the monolith. In this connection, it is particularly advantageous for the monolith to be in connection with the container exclusively via at least one elastic element. It is hereby ensured, on the one hand, that the monolith is mounted in the container in a vibration damped manner, i.e. also impact damped. On the other hand, elastic elements allow compensation of the tolerances which always occur with the monolith. Since the monolith can generally only be produced with relatively large tolerances with respect to its diameter, its length and its surface design, elastic elements which support the monolith allow a fast and simple installation, even if the monolith is present with relatively large tolerances with respect to its dimensions.

A particularly simple installation can be achieved in that a foam piece, for example a foam ring, which is stuck to the outer periphery of the monolith, is used as the elastic element.

In accordance with a further embodiment of the invention, a further container is provided in the container and serves for the reception of the monolith. In this way, the sensitive monolith is well protected. The further container can also have two openings, with one opening being sealingly adjacent to the regeneration air opening. It is hereby additionally ensured for the protection of the monolith that no hydrocarbons can reach the environment, since a connection is only present between the regeneration air opening and the active carbon through the further container in which, however, the monolith is arranged in a sealed manner so that all hydrocarbons are filtered in the monolith and cannot reach the environment.

A particularly compact embodiment, which is easy to install, results when the first container and the further container are two pipes which are arranged coaxially inside on another.

A particularly compact construction results when the further container extends substantially over the whole length of the first container, with both the monolith and the active carbon being able to be provided in the further monolith.

In accordance with a further advantageous embodiment, a first spring means can be provided which acts exclusively on the active carbon, with a second spring means being able to act directly or indirectly on an elastic support means of the monolith. In this embodiment, it is achieved—in addition to simple installation—that the spring means holds the monolith in its installation position, on the one hand, but provides a seal between the monolith and the further container, on the other hand.

BRIEF DESCRIPTION OF THE DRAWINGS

The present invention will now be described, by way of example, with reference to the accompanying drawing, in which:

FIG. 1 is a longitudinal section through a storage apparatus in accordance with the invention.

DESCRIPTION OF THE PREFERRED EMBODIMENT

The storage apparatus shown in the Figure for the temporary storage of volatile fuel components has a container 10 which has an inlet 12, an outlet 14 and a regeneration air opening 16. A support or a thread, to which connection hoses or lines can be attached, is respectively provided both at the inlet 12 and at the outlet 14 as well as at the regeneration air opening 16.

The container 10 is formed by a cylindrical pipe made of stainless steel which is closed by a base plate 18 of stainless steel at its left hand end in the Figure.

A further container 20 is provided at the interior of the container 10 and is likewise formed as a cylindrical pipe made of stainless steel and is received concentrically in the first container 10.

As the Figure shows, the further container 20 extends over approximately 80% of the length of the first container 10, with the further container 20 extending up to and into the region of the regeneration air opening 16.

In the right hand half of the further container 20 in the Figure, a cylindrical monolith 22 made of ceramic material is arranged which serves to prevent a discharge of hydrocarbons through the regeneration air opening. Two foam rings 24 and 26 serve for the support of the monolith 22, with one being stuck to the outer periphery of the monolith 22. The other foam ring loosely surrounds the monolith. The thickness of the foam rings 24 and 26 is here selected such that these are somewhat compressed on the insertion of the monolith 22 into the further container 20 so that a vibration damped support of the monolith 22 is ensured, on the one hand, and a seal is ensured between the inner container wall of the further container 20 and the monolith 22, on the other hand. All vapors from the interior of the container 10 can thus only move in the direction of the regeneration air opening 16 via the monolith 22.

A contaminant filter 28 is provided at the interior of the further container 20 in the region of the regeneration air opening 16 and extends over the total cross-section of the further container 20. A first spacer 30 is arranged between the contaminant filter 28 and the foam ring 26. A further spacer 32 is disposed between the two foam rings 24 and 26. A third spacer 34 is arranged at the interior of the further container 20 in front of the foam ring 24. A support structure 36 adjoins this spacer 34 and extends over the total cross-section of the further container 20. The support structure 36 serves, on the one hand, to support a foam filter 38 which is disposed at the rear side of the support structure 36. On the other hand, the support structure 36 transmits forces onto the spacers 30, 32, and 34 and thus also onto the foam rings 24 and 26.

As the Figure shows, active carbon 40 is arranged both in the first container 10 and in the further container 20. In the container 10, active carbon is disposed in the annular space between the first container 10 and the further container 20. In the further container 20, active carbon is arranged in the left hand half of the further container 20 in the Figure up to the foam filter 38. To support the active carbon in the first container 10, a ring-shaped support plate 42 is provided in the region of the base plate 18, said support plate 42 pressing toward the active carbon 40 via a foam filter ring 44. In this connection, to compress the active carbon strongly, a helical spring 46 is arranged between the base plate 18 and the support plate 42.

To compress the active carbon 40 disposed inside the further container 20, a further support plate 48 is disposed at the interior of the container 20 and presses toward the active carbon via a foam filter 50. To exert a holding force, a further helical spring 52 is provided between the base plate 18 and the support plate 48. A force is thus exerted on the support plate 48 with the aid of this further helical spring 52 and from there via the foam filter 50 on the active carbon 40 disposed inside the further container 20 and from there on the foam filter 38 and the support structure 36. The support structure 36 in turn transfers the force onto the spacer 34, the foam ring 24, the spacer 32, the foam ring 26 and finally the spacer 30. In this way, a fixed support of the foam rings 24 and 26 in the axial direction is achieved, on the one hand. At the same time, it is ensured that the monolith 22 is mounted in a vibration damped manner in the further container 20. As the Figure shows, a clear spacing is present between the outer periphery of the monolith 22 and the spacers 30, 32 and 34 so that the monolith does not come into contact with the spacers even under impacts.

The Figure further shows that a ring-like distributor element 54 is provided approximately at the center of the first container 10 and foam rings 56 and 58 adjoin it at its two sides. This distributor element serves for a better distribution of the vapors inside the container 10.

Finally, a further foam filter 60 is provided in the region of the inlet and of the outlet which fills up the annular space between the first container 10 and the further container 20.

The above-described storage apparatus is installed in a motor vehicle such that the inlet 12 is in connection with the tank of the motor vehicle and the outlet 14 is in connection with the inlet manifold of the internal combustion engine via a valve. The regeneration air opening 16 is here in connection with the ambient air. A venting of the fuel tank can thus only take place via the storage apparatus, i.e. the volatile fuel components flow via the inlet 12 first into the annular space between the first component 10 and the further component 20, which is filled with active carbon. At the same time, the gases can enter into the interior of the further container 20 via the support plate 42 and the support plate 48, which are each provided with bores. A discharge of the hydrocarbons to the ambient air through the regeneration air opening 16 is, however, not possible since the monolith 22 arranged in a sealing manner at the interior of the container 20 works as a fine filter and completely filters hydrocarbons.

In regeneration operation, the valve disposed between the outlet 14 and the inlet manifold of the engine is open so that an underpressure arises in the region of the outlet 14 and the fuel vapors collected in the storage apparatus are supplied to the engine for combustion as a mixture. Here, ambient air flows through the regeneration air opening 16 and the ceramic monolith 22.

What is claimed is:

1. A storage apparatus for temporary storage of volatile fuel components, comprising a container having an inlet, an outlet and a regeneration air opening, with active carbon comprising the storage medium in the container; wherein a ceramic monolith is provided in the container between the regeneration air opening and the active carbon to prevent discharge of hydrocarbons through the regeneration air opening; and, wherein the monolith is mounted in a vibration damped manner.

2. A storage apparatus for temporary storage of volatile fuel components, comprising a container having an inlet, an outlet and a regeneration air opening, with active carbon comprising the storage medium in the container; wherein a ceramic monolith is provided in the container between the regeneration air opening and the active carbon to prevent discharge of hydrocarbons through the regeneration air opening; and, wherein the monolith is in connection with the container exclusively via at least one elastic element.

3. An apparatus in accordance with claim 2, wherein the elastic elements are foam pieces with at least one of the elastic elements secured to the monolith by adhesive bonding.

4. A storage apparatus for temporary storage of volatile fuel components, comprising a first container having an inlet, an outlet and a regeneration air opening, with active carbon comprising the storage medium in the first container; wherein a ceramic monolith is provided in the first container between the regeneration air opening and the active carbon to prevent discharge of hydrocarbons through the regeneration air opening; and, wherein a further container is provided in the first container for receiving the monolith.

5. An apparatus in accordance with claim 4, wherein the further container has two openings, with one opening being sealingly adjacent to the regeneration air opening.

6. An apparatus in accordance with claim 4 wherein the first container and the further container are two coaxial pipes.

7. An apparatus in accordance with claim 4 wherein the monolith and active carbon are provided in the further container.

8. An apparatus in accordance with claim 4 wherein the further container extends over approximately 70 to 90% of the length of the first container.

9. An apparatus in accordance with claim 4, wherein a first spring means acts exclusively on the active carbon; and a second spring means acts on an elastic support means of the monolith.

* * * * *